United States Patent
Gordon et al.

(10) Patent No.: US 11,422,153 B2
(45) Date of Patent: Aug. 23, 2022

(54) AIR DATA PROBE REPLACEMENT DETERMINATION SYSTEM

(71) Applicant: Honeywell International Inc., Morris Plains, NJ (US)

(72) Inventors: Grant A. Gordon, Peoria, AZ (US); Merle L Sand, Scottsdale, AZ (US); Morris G. Anderson, Mesa, AZ (US)

(73) Assignee: Honeywell International Inc., Charlotte, NC (US)

( * ) Notice: Subject to any disclaimer, the term of this patent is extended or adjusted under 35 U.S.C. 154(b) by 275 days.

(21) Appl. No.: 16/752,399

(22) Filed: Jan. 24, 2020

(65) Prior Publication Data

US 2021/0231702 A1    Jul. 29, 2021

(51) Int. Cl.
   *G01P 21/00*    (2006.01)
   *G01P 5/10*    (2006.01)

(52) U.S. Cl.
   CPC ............... *G01P 21/00* (2013.01); *G01P 5/10* (2013.01)

(58) Field of Classification Search
   CPC .......... G01P 5/165; G01P 13/025; G01K 7/16
   See application file for complete search history.

(56) References Cited

U.S. PATENT DOCUMENTS

| 5,464,965 A | 11/1995 | McGregor et al. |
| 6,336,083 B1 | 1/2002 | Lanham et al. |
| 6,414,282 B1 | 7/2002 | Ice et al. |
| 7,725,293 B2 | 5/2010 | Bonissone et al. |
| 8,478,479 B2 | 7/2013 | Ghelam |
| 8,868,313 B2 | 10/2014 | Asti |
| 9,523,594 B1 | 12/2016 | Gordon et al. |
| 9,617,010 B2 | 4/2017 | Conrad |
| 10,430,800 B2 | 10/2019 | Remboski et al. |
| 2009/0055036 A1* | 2/2009 | Vozhdaev ............ G01P 1/02 701/14 |
| 2018/0275184 A1 | 9/2018 | Essawy et al. |

(Continued)

FOREIGN PATENT DOCUMENTS

| EP | 3018057 B1 | 9/2017 |
| EP | 3379266 A1 | 9/2018 |

(Continued)

OTHER PUBLICATIONS

European Patent Office, "Extended European Search Report from EP Application No. 21150812.2", from Foreign Counterpart to U.S. Appl. No. 16/752,399, dated Jun. 28, 2021, pp. 1 through 8, Published: EP.

(Continued)

*Primary Examiner* — Walter L Lindsay, Jr.
*Assistant Examiner* — Andrew V Do
(74) *Attorney, Agent, or Firm* — Fogg & Powers LLC

(57) ABSTRACT

Method and systems of determining when to replace an air data probe are provided. The method includes estimating air data probe temperatures based at least in part on available vehicle sensor data; tracking an amount of time an estimated temperature of the heating element is within at least one temperature range; and providing an air data probe replacement indication when a replacement threshold is met that is at least in part based on reaching a cumulative amount of time the heating element has an estimated temperature within the at least one temperature range.

20 Claims, 3 Drawing Sheets

(56) References Cited

U.S. PATENT DOCUMENTS

2019/0225245 A1    7/2019   Kulkarni et al.
2020/0072866 A1    3/2020   Gordon et al.

FOREIGN PATENT DOCUMENTS

EP        3617713 A1    3/2020
JP    2012253222 A    12/2012

OTHER PUBLICATIONS

U.S. Patent and Trademark Office, "Office Action", U.S. Appl. No. 16/118,905, dated Jul. 23, 2020, pp. 1 through 27, Published: US.
European Patent Office, "Communication pursuant to Article 94(3) EPC from EP Application No. 19194494.1", from Foreign Counterpart to U.S. Appl. No. 16/118,905, dated Feb. 23, 2021, pp. 1 through 6, Published: EP.
U.S. Patent and Trademark Office, "Notice of Allowance", U.S. Appl. No. 16/118,905, dated Jan. 25, 2021, pp. 1 through 10, Published: US.
Parker, "What is an oil life indicator?", HowStuffWorks, pp. 1-9, https://auto.howstuffworks.com/under-the-hood/car-part-longevity/oil-life-indicator.htm.
European Patent Office, "Extended European Search Report from EP Application No. 19194494.1", from Foreign Counterpart to U.S. Appl. No. 16/118,905, dated Dec. 4, 2019, pp. 1-8, Published: EP.

\* cited by examiner

AIR DATA PROBE REPLACEMENT DETERMINATION SYSTEM

BACKGROUND

The health and integrity of aircraft air data sensors play a critical role in safely and effectively flying and controlling an aircraft. Pitot Probes are used to measure the airspeed of an aircraft and Pitot Static probes are used to measure both the plane's altitude and air speed. Inaccurate or false readings from these sensors/instruments can lead to inappropriate flight control which can have fatal consequences. Hence operational air data probes are part of the minimum equipment list required for flight.

Unanticipated probe failures can lead to aircraft on ground, flight delays and cancelations events that can be very expensive to an air carrier. Aggravating the problem of probe failures that result in unscheduled maintenance, is the fact that the availability of air data probes can be limited. If the air carrier does not carry inventory, or if the inventory is centrally located the lead times and replacement times can be significant. Thus, air data probe customers value reliability over almost all other air data probe attributes.

The aversion to unscheduled maintenance is so strong that many operators pre-emptively replace pitot and other air data probes before they show signs of aging. For example, one major airline replaces their probes very early in the expected life cycle (after every 18,000 hrs.) to avoid unscheduled removals.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. Embodiments use estimates of operating temperatures of air data probe to predict the end of life of the data probes.

In one embodiment, a method of determining when to replace an air data probe is provided. The method includes estimating air data probe temperatures based at least in part on available vehicle sensor data; tracking an amount of time an estimated temperature of a heating element of the air data probe is within at least one temperature range; and providing an air data probe replacement indication when a replacement threshold is met that is at least in part based on reaching a cumulative amount of time the heating element has an estimated temperature within the at least one temperature range.

In another embodiment, another method of determining when to replace an air data probe is provided. The method includes estimating a temperature of at least one heating element of the air data probe from data read off of a data bus; tracking time when the at least one heating element has a measured temperature within defined temperature ranges; applying a cumulated weighted system that predicts the life expectancy of the air data probe based on the tracked time of the at least one heating element within each temperature range; and generating a remaining life expectancy signal of the air data probe based on the prediction of the cumulated weighted system.

In still another embodiment, an air data probe operating and monitoring system is provided. The system includes at least one heating element housed within an air data probe, at least one clock, at least one memory to store at least operating instructions and at least one controller. The at least one controller is in operational communication with a data bus. The at least one controller is configured to estimate a temperature of the air data probe based at least in part on data read off the data bus. The at least one controller is further configured to implement the operating instructions in the at least one memory to track time that the at least one heating element of the air data probe has an estimated temperature within defined temperature ranges using the at least one clock. The at least one controller further configured to apply a cumulated weighted function that predicts the life expectancy of the air data probe based on an accumulated time the heating element is tracked within each temperature range. An output is in communication with the at least one controller. The at least one controller configured to communicate a replace air data probe message to the output when a result of the cumulated weighted system reaches a select threshold.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a system and method of predicting when to replace an air data probe. For an airline operator, a high reliability outcome can be achieved if unscheduled maintenance can be avoided. Being able to predict with enough forewarning when an air data probe will fail is desired since it allows for the replacement of the air data probe during a scheduled maintenance event before the predicted failure. Embodiments provide systems and methods that can accurately track and predict an air data probe's health state so that remaining utility/lifetime can be determined. This allows for the air data probe to be replaced during a scheduled maintenance event.

The vast majority of air data probe failures are due to heater cable (heater element) failures. These types of failures tend to occur abruptly with little or no advanced notice. Investigations have shown that simple monitoring approaches such as cycle counting, time on wing and current monitoring, are not sufficient to track the onset of degradation and therefore are not a reliable approach for predicting the end of life of air data probes. In embodiments of the present application, an estimate of the operating temperature of an air data probe is used to predict the end of life of the data probe. Some embodiments use already available sensor data, that is obtained (read) off one or more available data buses, to estimate temperatures of air data probes.

Figure 1:
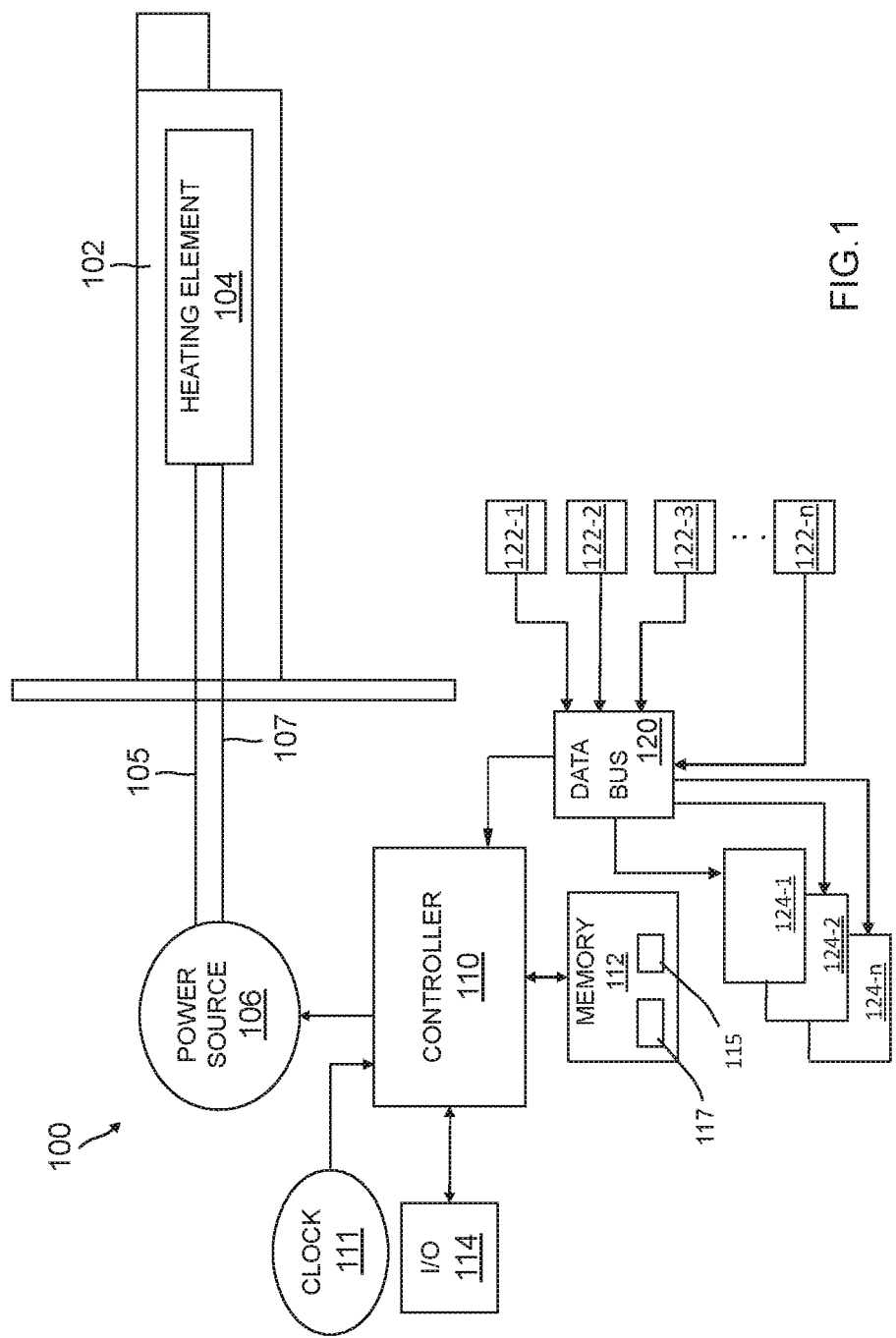
FIG. 1 illustrates a block diagram of an air data probe operating and monitoring system according to one example embodiment.

FIG. 1 illustrates an air data probe operating and monitoring system 100 of one example embodiment. The system 100 includes an air data probe 102. Within the air data probe is a heating element 104. Although only one heating element 104 is illustrated, an air data probe 102 may have more than one heating element. Hence, embodiments are not limited to one heating element 104. The heating element 104 is conductively coupled to a power source 106 via conductive lines 105 and 107 in this example.

A controller 110 is coupled to control operations of the power source 106. In particular, the controller 110 controls the drive voltage of power source 106. The control of the drive voltage applied to the heating element 104 is based at least in part on current operating parameters of the aircraft and conditions the air data probe 102 are experiencing.

In general, the controller 110 (processor) may include any one or more of a microprocessor, a digital signal processor (DSP), an application specific integrated circuit (ASIC), a field program gate array (FPGA), or equivalent discrete or integrated logic circuitry. In some example embodiments, controller 110 may include multiple components, such as any combination of one or more microprocessors, one or more controllers, one or more DSPs, one or more ASICs, one or more FPGAs, as well as other discrete or integrated logic circuitry. The functions attributed to controller 110 herein may be embodied as software, firmware, hardware or any combination thereof. Memory 112, which is also in communication with the controller 110, may include computer-readable instructions that, when executed by controller 110 provide functions of the controller 110. Such functions may include the functions relating to temperature probe estimations and the prediction of when to replace the air data probe 102. The computer readable instructions may be encoded within the memory 112. Memory 112 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Further in communication with the controller 110 is an input/output 114. In embodiments, the controller 110 outputs information relating to the life expectancy of the air data probe 102 to the input/output 114 and receives information regarding temperature ranges and associated life expectancy values as discussed below in detail. A clock 111 is used by the controller 110 to track time the heating element 104 is activated as discussed below.

The life times of electrical heaters are strongly dependent on the temperature that the filament reaches during operation. A power law relationship can be used to predict the decrease in lifetime that occur when the filament temperature is increased. The heater cable (heater element) temperatures are also strongly dependent on the operational conditions that they experience. A first order model of the lifetimes for the heater cables follow a power law relationship, as provided below, that is dependent on operational temperature, where the value for n can be found empirically through testing.

$$\frac{Life'}{Life} = \left(\frac{Temp}{Temp'}\right)^n$$

The exact relationship between lifetime, operational temperature and time may be different than the equation provided above. However, from this equation it is realized that both time and temperature are the important life limiting drivers. Since not all aircraft are operated in a similar manner (e.g. short versus long haul) their air data probes will not see the same operational conditions. Thus strictly counting flight hours or even cycles is not as effective as finding the cumulative duration that the probe spends at various temperatures.

As discussed above, the operational temperature is estimated in embodiments and in some embodiments, data already available is used to estimate the temperature. In the example of FIG. 1, the controller 110 is in communication with a data bus 120 that provides communication links between at least sensors 122-1 through 122-$n$ and operational systems 124-1 through 124-$n$ of a vehicle. For example, in an aircraft application, the data bus may be an A664 bus that passes data to an air data function and flight controls cabinet. In this type of data bus, necessary parameters needed to estimate the temperature of air data probes can be obtained.

In some embodiments, an a priori look up table 117 that is stored in a memory, such as memory 112, is used to estimate a probes temperature under various conditions. The input conditions for the table may be defined, for example, by the following minimum set of data that can be found on the ARINC A644 or A429 bus: power supplied, outside air temperature, and air speed. In some cases, the power supplied can be inferred from the on-ground/in-flight status condition. Based on the input conditions, the temperature of the probe is estimated from the table in near real time to produce a digital 'strip chart' 115 of temperature versus time experienced by the probe. The strip chart 115 may be stored as a two-column array or compressed using standard techniques into a smaller data set in the memory 112.

There are a variety of sources for air data speed and air temperature published on the A664 bus output that may be used. For example, for air data speed from an interface control document (ICD) for the COMAC C919 there are a variety of sources that are published on the A664 bus. Also, from the ICD for the COMAC C919 there are a variety of sources for air temperature published on the A664 bus output.

Further, there may be an advantage to using an engine total air temperature (TAT) sensor signal taken off (read off) the A664 bus, since TAT probes require air flow over the sensor to perform accurately. In the case of engine TAT sensors, the air flow is provided when the engine is running whereas the avionic TAT sensor signal is not accurate until the aircraft has lifted off the ground and is moving at a given Mach number. Examples of engine TAT signals are available on a COMAC C919 ICD subsection. Further engine running, weight on wheels and time stamp data are all available on the associated buses.

In one embodiment, the air-data function on the COMAC C919 that captures sensor signals in an associated bus is used to gather the information needed for the estimate. By subscribing to these ARINC 664 bus sensor signals, an estimate of the probe temperature verses time based on flight condition, outside air temperature, air speed may be determined. In an embodiment an algorithm, stored as instructions in the memory 112, is executed by the controller 110 to determine the estimated air temperature probe and the associated time the air temperature is at the estimated air temperature based on the sensor data and an input of the clock 111.

Since the air data probe 102 is not constantly operating at a single temperature there needs to be a way to accumulate the thermal stress experienced by the probe heater over time. In some embodiments, a modified Miner's rule is used to accumulate the thermal stress experienced over time. The Miner's rule is commonly used for calculating the remaining life of a structural component that is undergoing cyclical stress. Embodiments consider thermally induced fatigue experienced by the probe as analogous to cyclical fatigue stress. Use of the Miner's rule also known as the Palmgren-Miner linear damage hypothesis, provides a method for combining different operational exposures along with the time of exposure to determine the cumulative life consumed by the probe while in operation. The rule is as follows:

$$C = \sum_{i=1}^{n} di/Di$$

Where C is the fraction life consumed. When C=1 the probe life has been expended. Di is the length of time that the probe can survive under a given temperature condition, i. And di is the accumulated length of time that the probe has experience under that temperature condition.

In implementing this approach embodiments break a continuous range of estimated temperatures into discrete estimated temperature ranges. These ranges (or segments) may be defined with thresholds similar to how an air data heater controller (ADHC) determines if the probe is operational. For example, the data collected could be continuously updating a histogram of estimated temperature versus time. This histogram may be implemented in software or a simple digital hardware design that accumulates counts (time) at given threshold values (temperature conditions). This data may be stored locally on a digital probe or collected, stored or broadcast by an air data module. Further in one example embodiment, the data is passed to an onboard maintenance computer for local storage or datalink transmission to a ground based recipient. The remaining life of the probe may be determined using the above equation with the histogram counts.

Figure 2:
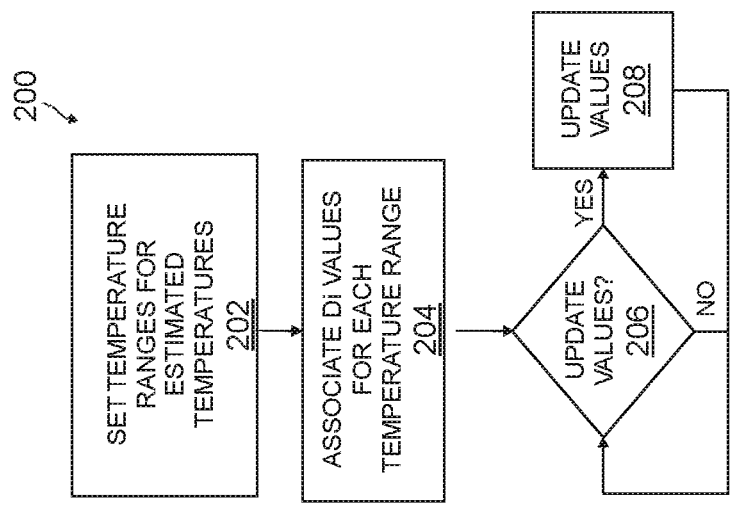
FIG. 2 illustrates a set up flow diagram for updating the prediction algorithm based on collected data according to one example embodiment.

A set up flow diagram 200 for updating the prediction algorithm based on collected data of an embodiment is illustrated in the prior art FIG. 2. The set up flow diagram 200 starts at step (202), setting ranges for the estimate temperatures. At step (204), a life expectancy value of Di is assigned to each temperature range. A life expectancy value relates to a life expectancy period of time of an air data probe in a specific temperature range. In one embodiment the life expectancy values and ranges are stored in memory 112 via the I/O 114. Further in embodiments, the period of time of life expectancy (Di values) for each temperature range may be updated as information relating to period of time of life expectancy vs temperature range is gathered. Hence in this embodiment, when it is determined if that updated values are available at block step (206), update values can be used to improve the prediction of remaining life are provided at step (208).

Figure 3:
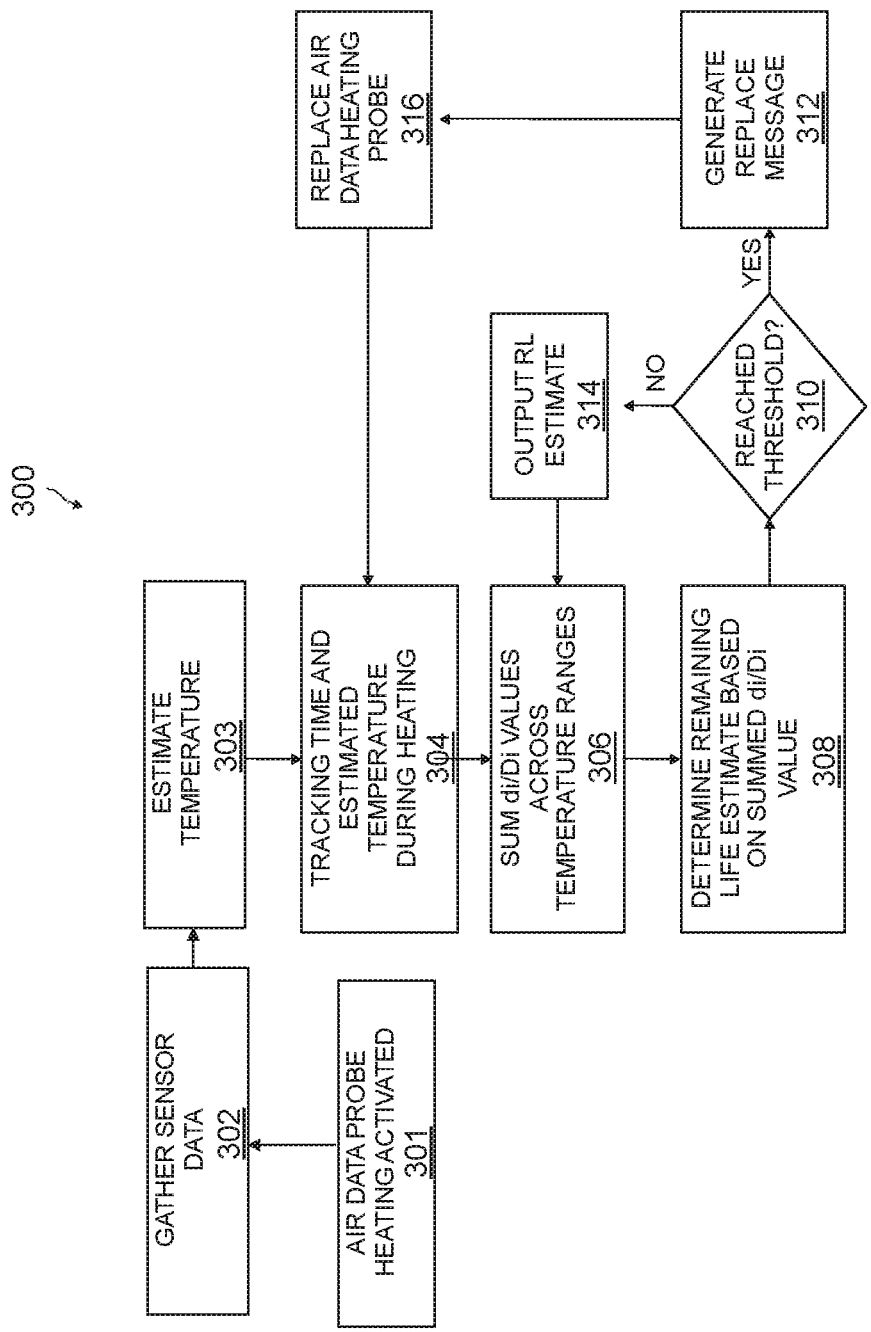
FIG. 3 illustrates an air data probe life expectancy flow diagram according to one example embodiment.

An air data probe life expectancy flow diagram 300 of an embodiment is illustrated in FIG. 3. The air data probe life expectancy flow diagram 300 is provided as a sequential series of blocks. The sequence of blocks may be different in other embodiments. Hence, embodiments are not limited by the sequence of blocks set out in FIG. 3.

The air data probe life expectancy flow diagram 300 starts when an associated heating element 104 of an air data probe 102 is activated at block (301). During the heating of air data probe 102, the controller 110, with the use of clock 111 tracks the time while the data probe is activated. Sensor data, as described above, is gathered at block (302) and the temperature of the probe is estimated based on the sensor data at block (303). As discussed above, the sensor data is indirect sensor data measurements (i.e. it is sensor data not directly measuring the temperature of the probe) that may be taken off an associated communication data bus. The estimated temperature and time is tracked at block (304).

At block (306), the controller 110, sums the di/Di values across temperature ranges as the heating element 104 of the air data probe 102 is being heated. The currently determined remaining life estimate based on the di/Di is determined at block (308) via the controller 110. In an embodiment, it is then determined at block (310) if a defined threshold is reached by comparing a current result of C, the sum of di/Di components, to the defined threshold. If the threshold is reached at block (310), a replace message is generated at block (312) that is communicated to the I/O 114. If the threshold is not reached at block (310), in one embodiment, an estimate of remaining life estimate is output to the I/O 114 at block (314). The remaining life estimate is based off of the then current value of the di/Di in an embodiment. The process then continues at block (306) summing di/Di values as long as the heating element is activate. Further in one embodiment, the air data probe 102 is replaced at block (312) when a replace message generated at block (312) is received at the I/O 414. The process continues by monitoring the heating element of the new air data probe 102 at block (304) of the probe 102 when heating is activated.

In summary, airline operators are so averse to suffering an unscheduled repair of air data probes that they are removing the probes based on hours of operation well before their predicted end of life. With the implementation of the above described embodiments, a much more effective tool for predicting end of life based on the operational exposure of the air data probes via time and temperature history is provided. Moreover, embodiments provide a predictable maintenance, fewer grounded aircraft, predictable and lower probe spare inventory and longer use of existing probes that would otherwise have thousands of hours more useful life left when replaced based purely on hours of operation. Further, since the embodiments used data already available, no addition cost associated with new sensors are needed.

Example Embodiments

Example 1 is a method of determining when to replace an air data probe. The method includes estimating air data probe temperatures based at least in part on available vehicle sensor data; tracking an amount of time an estimated temperature of a heating element of the air data probe is within at least one temperature range; and providing an air data probe replacement indication when a replacement threshold is met that is at least in part based on reaching a cumulative amount of time the heating element has an estimated temperature within the at least one temperature range.

Example 2 includes the method of Example 1, wherein the available sensor data includes at least one of weight on wheels data, engine total air temperature data, avionic total air temperature data, flight condition data, outside temperature data and air speed data.

Example 3 includes the method of any of the Examples 1-2, wherein estimating air data probe temperatures based on available vehicle sensor data further includes selecting an estimated air data probe temperature from a priori look up table that includes estimated temperatures associated with vehicle sensor data.

Example 4 includes the method of any of the Examples 1-3, wherein the available vehicle sensor data is read off an avionic data bus.

Example 5 includes the method of any of the examples 1-4, further including storing estimated temperatures verses time in a strip chart.

Example 6 includes the method of any of the examples 1-5, wherein when more than one temperature range is used, the method includes applying a cumulated weighted system that tracks the usage and predicts the life expectancy of the air data probe based on temperatures of the heating element over time within each temperature range.

Example 7 includes the method of any of the examples 1-6, further including adjusting the replacement threshold based at least in part on gathered data relating to the remaining life of the air data probe.

Example 8 includes the method of any of the examples 1-7, further including generating a remaining life estimate based at least in part on the estimated temperature of the heating element and the tracked amount of time the heating element is within at least one temperature range.

Example 9 includes the method of any of the examples 1-9, further including, setting temperature ranges; and associating a period of time of life expectancy with each temperature range.

Example 10 includes a method of determining when to replace an air data probe, the method including estimating a temperature of at least one heating element of the air data probe from data read off of a data bus; tracking time when the at least one heating element has a measured temperature within defined temperature ranges; applying a cumulated weighted system that predicts the life expectancy of the air data probe based on the tracked time of the at least one heating element within each temperature range; and generating a remaining life expectancy signal of the air data probe based on the prediction of the cumulated weighted system.

Example 11 includes the method of Example 10, further including, setting the temperature ranges; and associating a period of time of life expectancy with each temperature range.

Example 12 includes the method of any of the examples 10-11, wherein applying a cumulated weighted system further includes summing period of time of life expectancies over a length of time the at least one heating element can survive under a given temperature range across all temperature ranges.

Example 13 includes the method of any of the examples 10-12, further including, providing an air data probe replacement indication when a replacement threshold is met that is at least in part based on reaching a cumulative amount of time the heating element has an estimated temperature within the at least one temperature range.

Example 14 includes the method of any of the examples 10-13, further including, adjusting the replacement threshold based at least in part on gathered data relating to the remaining life of the air data probe.

Example 15 includes an air data probe operating and monitoring system, the system includes at least one heating element housed within an air data probe, at least one clock, at least one memory to store at least operating instructions and at least one controller. The at least one controller is in operational communication with a data bus. The at least one controller is configured to estimate a temperature of the air data probe based at least in part on data read off the data bus. The at least one controller is further configured to implement the operating instructions in the at least one memory to track time that the at least one heating element of the air data probe has an estimated temperature within defined temperature ranges using the at least one clock. The at least one controller further configured to apply a cumulated weighted function that predicts the life expectancy of the air data probe based on an accumulated time the heating element is tracked within each temperature range. An output is in communication with the at least one controller. The at least one controller configured to communicate a replace air data probe message to the output when a result of the cumulated weighted system reaches a select threshold.

Example 16 includes the system of Example 15, wherein the at least one controller is further configured to estimate the temperature of the at least one heating element by comparing the data read off the data bus with a priori look up table with estimated temperatures.

Example 17 includes the system of any of the Examples 15-16, wherein the at least one controller is further configured to sum a period of time of life expectancies over a length of time the at least one heating element can survive under a given temperature range across all temperature ranges in applying the cumulated weighted function.

Example 18 includes the system of any of the Examples 15-17, wherein the at least one controller is further configured to generate a remaining life expectancy signal that is communicated to the output.

Example 19 includes the system of any of the Examples 15-18, further including an input in communication with the at least one controller, the input configured to communicate the temperature ranges and an association of period of time of life expectancies with each temperature range to the at least one controller for storage in the at least one memory.

Example 20 includes the system of any of the Examples 15-19, wherein the at least one controller is further configured to update the temperature ranges and associated period of time of life expectancies with each temperature range.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of determining when to replace an air data probe, the method comprising:
estimating air data probe temperatures based at least in part on available vehicle sensor data used for an operation of a vehicle that includes the air data probe;
tracking an amount of time an estimated temperature of a heating element of the air data probe is within at least one temperature range; and
providing an air data probe replacement indication when a replacement threshold is met that is at least in part based on reaching a cumulative amount of time the heating element has an estimated temperature within the at least one temperature range.

2. The method of claim 1, wherein the available vehicle sensor data includes at least one of weight on wheels data, engine total air temperature data, avionic total air temperature data, flight condition data, outside temperature data and air speed data.

3. The method of claim 1, wherein estimating air data probe temperatures based on available vehicle sensor data further comprises:
selecting an estimated air data probe temperature from a priori look up table that includes estimated temperatures associated with vehicle sensor data.

4. The method of claim 1, wherein the available vehicle sensor data is read off an avionic data bus.

5. The method of claim 1, further comprising:
storing estimated temperatures verses time in a strip chart.

6. The method of claim 1, wherein when more than one temperature range is used, the method further comprises:
applying a cumulated weighted system that tracks the usage and predicts the life expectancy of the air data probe based on temperatures of the heating element over time within each temperature range.

7. The method of claim 1, further comprising:
adjusting the replacement threshold based at least in part on gathered data relating to the remaining life of the air data probe.

8. The method of claim 1, further comprising;
generating a remaining life estimate based at least in part on the estimated temperature of the heating element and the tracked amount of time the heating element is within at least one temperature range.

9. The method of claim 1, further comprising:
setting temperature ranges; and
associating a period of time of life expectancy with each temperature range.

10. A method of determining when to replace an air data probe, the method comprising:
estimating a temperature of at least one heating element of the air data probe from data read off of a data bus;
tracking time when the at least one heating element has a measured temperature within defined temperature ranges;
applying a cumulated weighted system that predicts the life expectancy of the air data probe based on the tracked time of the at least one heating element within each temperature range; and
generating a remaining life expectancy signal of the air data probe based on the prediction of the cumulated weighted system.

11. The method of claim 10, further comprising:
setting the temperature ranges; and
associating a period of time of life expectancy with each temperature range.

12. The method of claim 10, wherein applying a cumulated weighted system further comprises:
summing period of time of life expectancies over a length of time the at least one heating element can survive under a given temperature range across all temperature ranges.

13. The method of claim 10, further comprising:
providing an air data probe replacement indication when a replacement threshold is met that is at least in part based on reaching a cumulative amount of time the heating element has an estimated temperature within the at least one temperature range.

14. The method of claim 10, further comprising:
adjusting the replacement threshold based at least in part on gathered data relating to the remaining life of the air data probe.

15. An air data probe operating and monitoring system, the system comprising:
at least one heating element housed within an air data probe;
at least one clock;
at least one memory to store at least operating instructions;
at least one controller in operational communication with a data bus, the at least one controller configured to estimate a temperature of the air data probe based at least in part on data read off the data bus, the at least one controller further configured to implement the operating instructions in the at least one memory to track time that the at least one heating element of the air data probe has an estimated temperature within defined temperature ranges using the at least one clock, the at least one controller further configured to apply a cumulated weighted function that predicts the life expectancy of the air data probe based on an accumulated time the heating element is tracked within each temperature range; and
an output in communication with the at least one controller, the at least one controller configured to communicate a replace air data probe message to the output when a result of the cumulated weighted system reaches a select threshold.

16. The system of claim 15, wherein the at least one controller is further configured to estimate the temperature of the at least one heating element by comparing the data read off the data bus with a priori look up table with estimated temperatures.

17. The system of claim 15, wherein the at least one controller is further configured to sum a period of time of life expectancies over a length of time the at least one heating element can survive under a given temperature range across all temperature ranges in applying the cumulated weighted function.

18. The system of claim 15, wherein the at least one controller is further configured to generate a remaining life expectancy signal that is communicated to the output.

19. The system of claim 15, further comprising:
an input in communication with the at least one controller, the input configured to communicate the temperature ranges and an association of period of time of life expectancies with each temperature range to the at least one controller for storage in the at least one memory.

20. The system of claim 15, wherein the at least one controller is further configured to update the temperature ranges and associated period of time of life expectancies with each temperature range.

* * * * *